United States Patent [19]

Arter et al.

[11] 4,367,947
[45] Jan. 11, 1983

[54] DOCUMENT FEEDER FOR MOVING BED MACHINES SUCH AS COPIERS

[75] Inventors: Nelson K. Arter, Longmont; William C. Dodt, Broomfield; Charles A. Farel, Boulder, all of Colo.

[73] Assignee: International Business Machines Corporation, Armonk, N.Y.

[21] Appl. No.: 265,518

[22] Filed: May 20, 1981

[51] Int. Cl.³ .................................. G03B 27/62
[52] U.S. Cl. .......................... 355/75; 271/4; 355/3 SH; 355/77
[58] Field of Search ............... 355/3 SH, 14 SH, 8, 355/11, 50, 51, 75, 76, 77; 271/4, DIG. 2, DIG. 9

[56] References Cited

U.S. PATENT DOCUMENTS

| | | | |
|---|---|---|---|
| 3,910,570 | 10/1975 | Bleau | 271/245 |
| 4,068,949 | 1/1978 | Booth et al. | 355/75 |
| 4,073,585 | 2/1978 | Kobayashi et al. | 355/3 SH X |
| 4,080,064 | 3/1978 | Komori et al. | 355/51 |
| 4,190,359 | 2/1980 | Murayama et al. | 355/75 |
| 4,192,608 | 3/1980 | Goshima et al. | 355/51 |
| 4,204,730 | 5/1980 | Miyashita et al. | 355/14 R |
| 4,247,192 | 1/1981 | Komori et al. | 355/8 |
| 4,264,187 | 4/1981 | Rhodes, Jr. | 355/3 SH X |

FOREIGN PATENT DOCUMENTS

4290 10/1979 European Pat. Off. ......... 355/3 SH

OTHER PUBLICATIONS

IBM Technical Disclosure Bulletin, vol. 17, No. 5, Oct. 1974, "Paper Table Actuated Feed Rollers and Paper Gate", W. F. Klein et al., (pp. 1263–1264).

*Primary Examiner*—Richard A. Wintercorn
*Attorney, Agent, or Firm*—Earl C. Hancock

[57] ABSTRACT

In a machine having a reciprocating original document handling carriage such as a copier, a roller at the bottom of a sloped ramp rests on the upper surface of the carriage. Documents placed on the ramp slide downward until the leading edge is at the nip between the roller and carriage surface. Movement of the carriage pulls the document from the tray onto the carriage surface for scanning. An additional roller can be included to provide automatic document ejection by pushing the document onto an output tray as the carriage returns.

22 Claims, 12 Drawing Figures

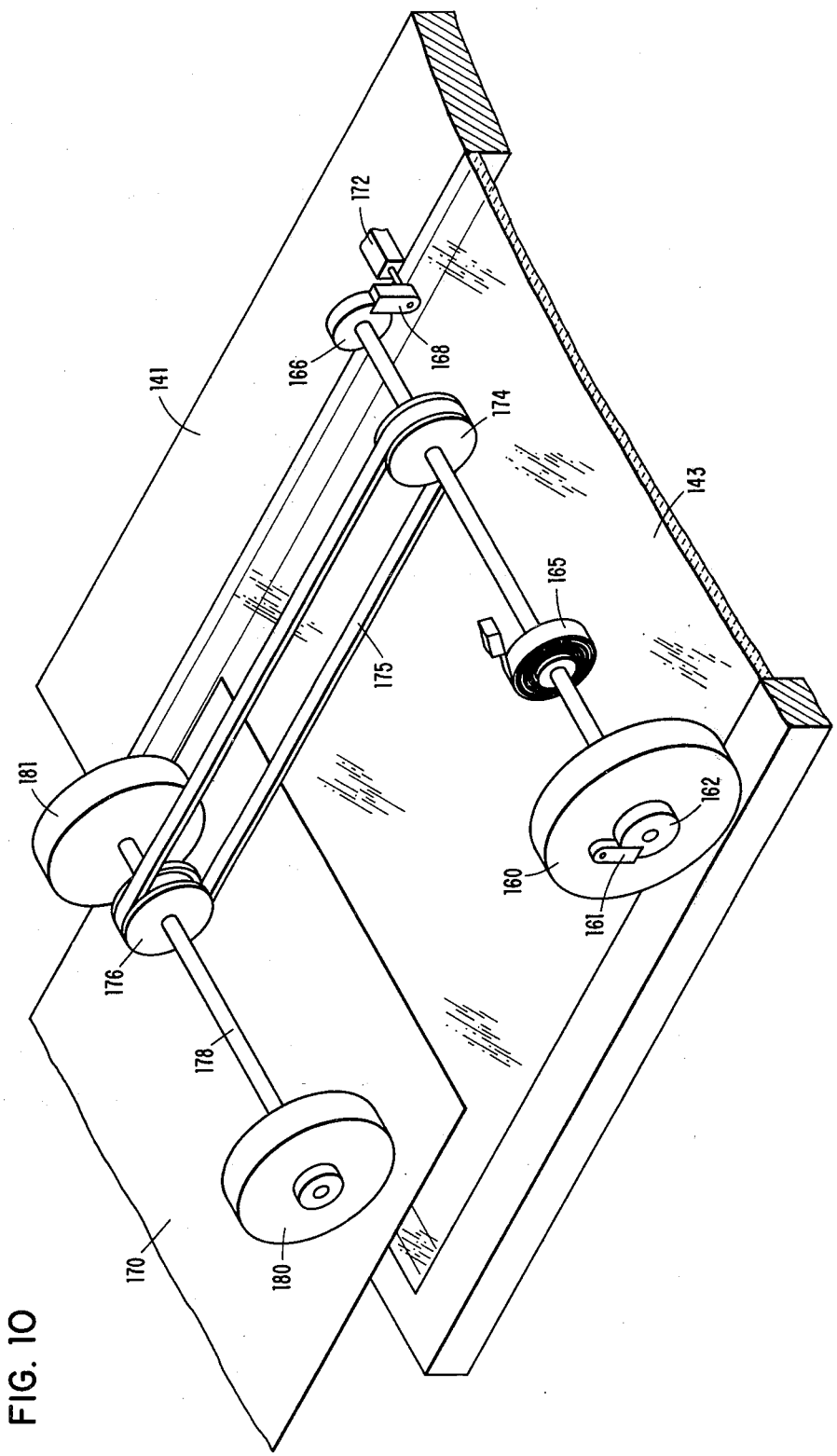

DOCUMENT FEEDER FOR MOVING BED MACHINES SUCH AS COPIERS

DESCRIPTION

Cross-Reference to Related Application

Application Serial No. 265,517, entitled "Document Ejector Apparatus and Method Useful for Copiers," by N. K. Arter, M. D. Avritt, W. C. Dodt and M. J. Herman, filed concurrently herewith and assigned to the same assignee as the present application, claims a separate invention that was a direct outgrowth of the basic invention claimed in this application. Although the embodiments originally conceived for utilizing the document ejector invention claimed in this application differed from the embodiments shown herein, the ejector mechanisms shown herein, as well as shown and claimed in the aforementioned cross-reference application are considered to set forth the best mode presently contemplated for implementing the document ejector invention claimed herein. Therefore, the preferred embodiments described hereinbelow are substantially the same as set forth in the cross-reference application.

Technical Field

The present invention relates to methods and apparatus for introducing and/or ejecting sheets relative to the carriage or carrier of a moving bed. More particularly, the present invention relates to document handling apparatus and methods wherein the document is transported on the surface of a carriage past a station where an operation is performed relative to the document. Although not necessarily so limited, this invention is especially useful in association with xerographic copier/duplicators employing carriages which follow a reciprocating motion to pass a document to be copied past a scan window. The invention is particularly well suited for low cost, table-top or compact copiers.

Background Art

Transfer of original document images onto a photosensitive surface in copier devices is obtained by several different techniques. For instance, the document is sometimes positioned manually or fed by rollers or belts into a fixed position on a transparent platen so that moving optic elements can scan the image. Other copiers use fixed optics and some form of driven mechanism to move the document past a scan window at a controlled rate. Some fixed-optics copiers use drive rollers or belts to propel the original documents across the scan window either in single passes or recirculating mode such as is taught by U.S. Pat. No. 2,741,960 by Oldenbloom.

The present invention is primarily concerned with fixed optics copiers that have a transparent platen containing carriage on which the document to be copied is placed. The carriage bed is movable in a reciprocating motion over an optical scan window as taught by U.S. Pat. Nos. 2,959,095 by Magnusson and 3,554,640 by Hoskins. It has also been known to include in a single machine combinations of reciprocating carriages and single sheet feeders either as separate units with switchable fixed optics or as an integral unit. The sheet feeder is advantageous for its fast operation but is not compatible with copying books, odd shaped objects or the like which can be copied on reciprocating carriage devices.

With conventional fixed-optics, reciprocating carriage copiers, the document to be copied is manually centered on the platen and a cover closed on the document to hold it in place during carriage movement. This procedure is awkward for the machine operator and reduces the overall operating speed of the machine. Addition of a sheet feeder to the reciprocating carriage machine, either as a separate unit with optic switching or as an integral element in the structure of the carriage bed with mechanisms to appropriately position and control the operation between stationary sheet feed or moving carriage modes, is unacceptable for several reasons. For low cost or compact copiers, such alternatives involve acceptance of added cost and undesirable complexity as well as extended space requirements in some cases. Further, the machine operating procedures become more complex which is particularly undesirable for office copiers.

Unfortunately, the prior art has not suggested any solutions acceptable for low cost copiers whereby single sheets can be automatically fed to and/or removed from a reciprocating carriage in a fixed-optics system. It is the solution to these problems to which this invention is directed.

Disclosure of the Invention

The present invention is concerned with methods and apparatus for feeding and/or removing documents relative to the carriage of a copier/duplicator where the carriage moves in a reciprocal manner so that a surface thereof passes over a station where an operation is performed with respect to the documents. Preferably, the operation performed at the station is optical scanning of the document at a scan window as in office copiers, facsimile transmission devices, optical character readers, and so forth. The document feeder includes means such as one or more rollers forming a nip with the carriage surface and guide means such as a ramp arranged in cooperative relation with the carriage. That is, the nip forming means applies a force at the nip in a normal direction towards the carriage surface. This nip usually is at an upstream location relative to the station.

The guide means is positioned for directing the leading edge of original documents into the nip between the nip forming means and the carriage surface so that carriage movement causes a document so positioned to be held against the carriage surface by the normal (i.e. perpendicular) force and to be carried by the carriage past the station. Preferably, the guide means is on the upstream side of the nip and is directed towards the carriage surface. Thus, movement of the carriage surface causes any document at that nip to be gripped against the carriage surface with the result that the document is carried by the carriage across the station.

In the context of the application, upstream is generally intended to mean a location such that a given point on the carriage surface that encounters both the nip and the station during scanning motions will encounter the nip before encountering the station as the carriage is traveling through the document scanning portion of its motion. Conversely, downstream refers to opposite locations wherein the station is encountered before the nip as the carriage moves in a nonscanning direction.

Document feeders in accordance with this invention can include means downstream from the station for blocking reverse movement of a document on the carriage surface when the carriage reverses direction. By so doing, the document is removed from the carriage surface. The document removal means can take the form of one or more rollers and can be selectively operable as by hand or a copier controlled mechanism (e.g., a solenoid), for example, to perform its document ejection operation.

The document feeder is mountable between its normally operable position as described above and a non-operating position wherein it is clear of the carriage surface thereby permitting book or odd shaped object copying. The guide means can include a sensor to provide a signal to the copier in the presence of a document so that a copy cycle can be initiated. The guide means can also include gate means for retaining a second document until copying of the first document is complete.

The present invention is especially advantageous in that the apparatus is manufacturable at a relatively low cost thereby being attractive for low cost, compact copier applications. Although sometimes characterized as a "semiautomatic document feeder" or SADF, this invention is well suited for adaptation to automatic document feeders. Furthermore, the present invention is endowed with the advantage that little or no modification is required for the copier to which it is attached.

The foregoing and other objects, features, advantages and applications of the present invention will be readily apparent to those having normal skill in the art from the following more detailed description of the preferred embodiments as illustrated in the accompanying drawings.

BRIEF DESCRIPTION OF THE DRAWINGS

FIG. 10 is another document ejector embodiment particularly well-suited for a copier in accordance with FIG. 8.

DETAILED DESCRIPTION OF THE PREFERRED EMBODIMENTS

Figure 1:
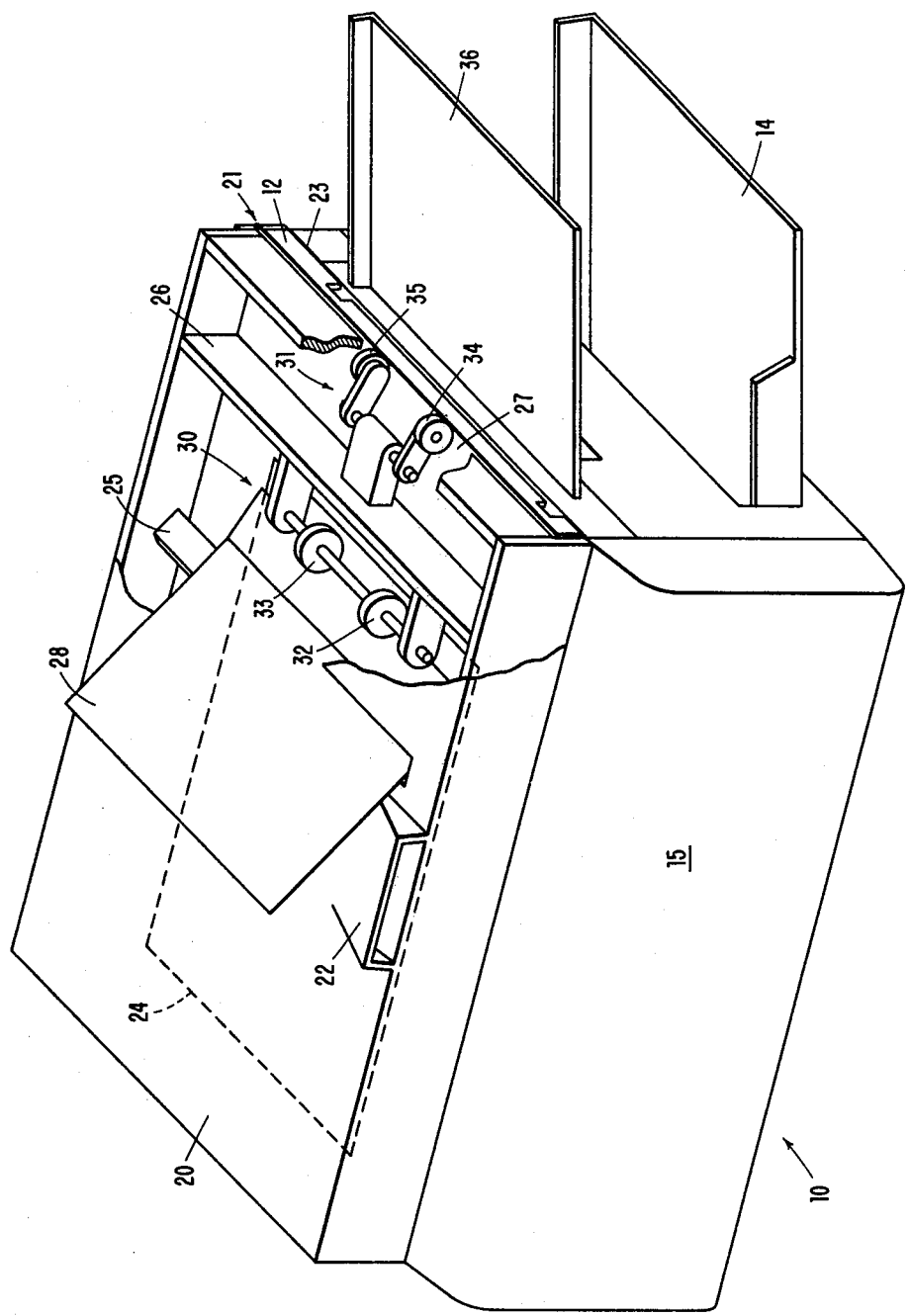
FIG. 1 is a perspective view of a copier including a document feeder in accordance with this invention.

The exemplary embodiment shown in FIG. 1 includes a copier 10 which has conventional xerographic components internally for producing copies from documents scanned as a result of the reciprocating motion of carriage 12. That is, the image of an original document, or the like, carried by carriage 12 past a scan window is transferred to a copy sheet from a cassette (not shown).

These copy sheets are processed internally through copier 10 and ultimately deposited in output tray 14. Appropriate control buttons (not shown) are included typically on front panel 15 such as on the upper sloped portion thereof. The xerographic processing elements of copier 10 generally form no part of this invention, but by way of example, might be essentially the same as those included in the IBM Executive Copier Model 102.

Housing 20 is pivotally attached by hinge 21 along the rear edge of copier 10 so as to overlie the reciprocating carriage 12. Thus transparent platen 24 which is an integral part of reciprocating carriage 12 is normally covered by housing 20 when copier 10 is in its idle state. However, housing 20 can be considerably shorter than as shown since it only needs to be of a size adequate to cover the scan window area. In addition, housing 20 is liftable by handle 22 for access to carriage 12 in general, and transparent platen 24 in particular. Typically, cover housing 20 is made of lightweight plastic and/or counterweighted for ease in lifting.

Figure 2:
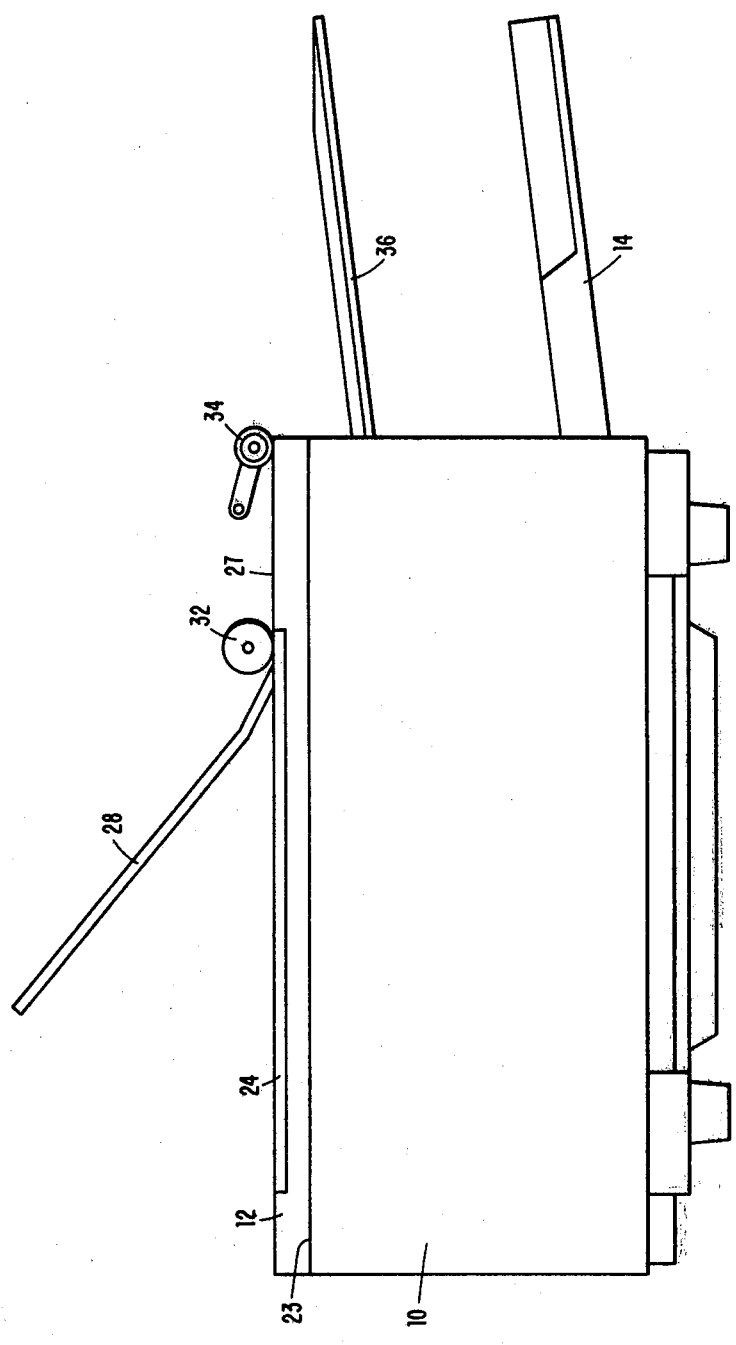
FIG. 2 is a side view of the FIG. 1 structure in its normal position.

Housing 20 has cross members 25 and 26 extending laterally between the side members. An input chute or ramp 28 is attached to bar 25 for receiving documents to be copied. A freely rotatable roller assembly 30 is attached on one side of crossbar 26 whereas a second roller assembly 31 is attached to the opposite side of crossbar 26. Assembly 30 includes roller wheels 32 and 33 which are retained so as to rest upon the upper surface of reciprocating carriage 12. More particularly, and as is best seen in FIG. 2, the nip formed by rollers 32 and 33 with the upper surface of reciprocating carriage 12, is such that it is in substantial alignment with the reference line for aligning document leading edges on transparent platen 24 when carriage 12 is in its rest or idle position. Assembly 31 provides a document ejection function through roller wheels 34 and 35 which are arranged to rest upon and rotate with the upper surface of reciprocating carriage 12.

Figure 3:
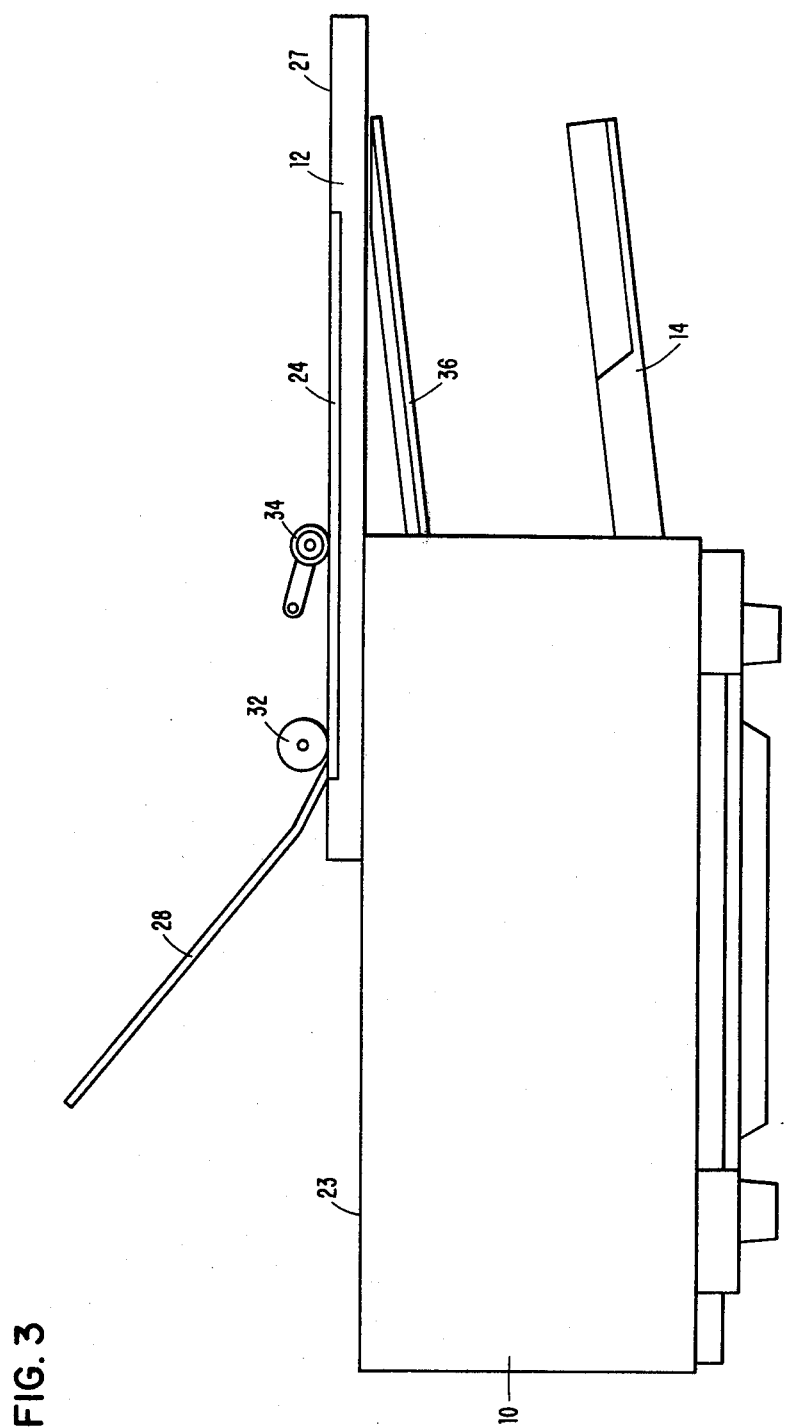
FIG. 3 is a side view of the FIG. 1 structure at the end of the document scanning movement for the carriage bed.

The operation of the document feed and ejector mechanisms are illustrated in FIGS. 2 and 3. The original document to be copied is introduced on ramp or guide means 28 so that the leading edge is at the nip between rollers 32-33 and the upper surface of carriage 12 and particularly at the leading edge reference line for transparent platen 24. The copier is then started, and as carriage 12 moves to the right, rollers 32 and 33 apply a force on the document in a normal or perpendicular direction towards the carriage 12 surface. Thus the document is gripped between the upper surface of carriage 12 and rollers 32 and 33 so that it slides from ramp 28 and is carried by carriage 12 across the document scanning window associated with the upper surface of the base of copier 10. A fixed optic system internal to copier 10, transfers the image of that document for further processing in a conventional manner internally to copier 10.

Eventually, carriage 12 reaches the end of its scanning motion associated with its reciprocal movement and assumes a position generally shown in FIG. 3. Carriage 12 then reverses its direction of movement and returns to the home position of FIG. 2. It will be recognized that other reciprocal motion sequences can be involved in the movement of carriage 12. For instance, the carriage can follow a three segment scan sequence as is described later for FIGS. 8-10.

Rollers 34 and 35 are positioned to eject the document thus copied from the carriage 12 surface onto exit tray 36 as carriage 12 begins its reverse direction movement towards its home position. For this purpose, rollers 34 and 35 can include a unidirectional rotational mechanism such as a pawl and ratchet arrangement that is either continuously operable or selectively operable. Once carriage 12 reaches its position shown in FIG. 3 and begins its reverse direction movement, rollers 34 and 35 stop rotating because they are blocked from turning in the reverse direction. As a result, the document is retained at its extended position so that it drops towards tray 36. In the event that a long document is copied such that its trailing edge does not pass beyond rollers 34 and 35, it may be necessary to manually complete removal of the document to the exit tray 36 or to include an additional ejector arrangement as will be described later. Note that the document ejector function associated with assembly 31 can likewise be provided by other means such as an air jet, a movable scraper blade or finger, a vacuum gripper, or any of a wide variety of mechanisms.

In the exemplary embodiment shown in FIGS. 1-3, carriage 12 reciprocates over the upper surface 23 of copier 10. Surface 23 includes a slot-type scan window to transfer the image of any document contained on platen 24 of carriage 12 as carriage 12 reciprocates across that scan window. When copying objects that cannot be readily fed through the input ramp and feed rollers as when copying books, awkward objects, or the like is required, the entire housing 20 is pivotable upwardly around hinge 21 to allow placement of the object directly on platen 24 and reciprocation of carriage 12 for copying the object.

Figure 4:
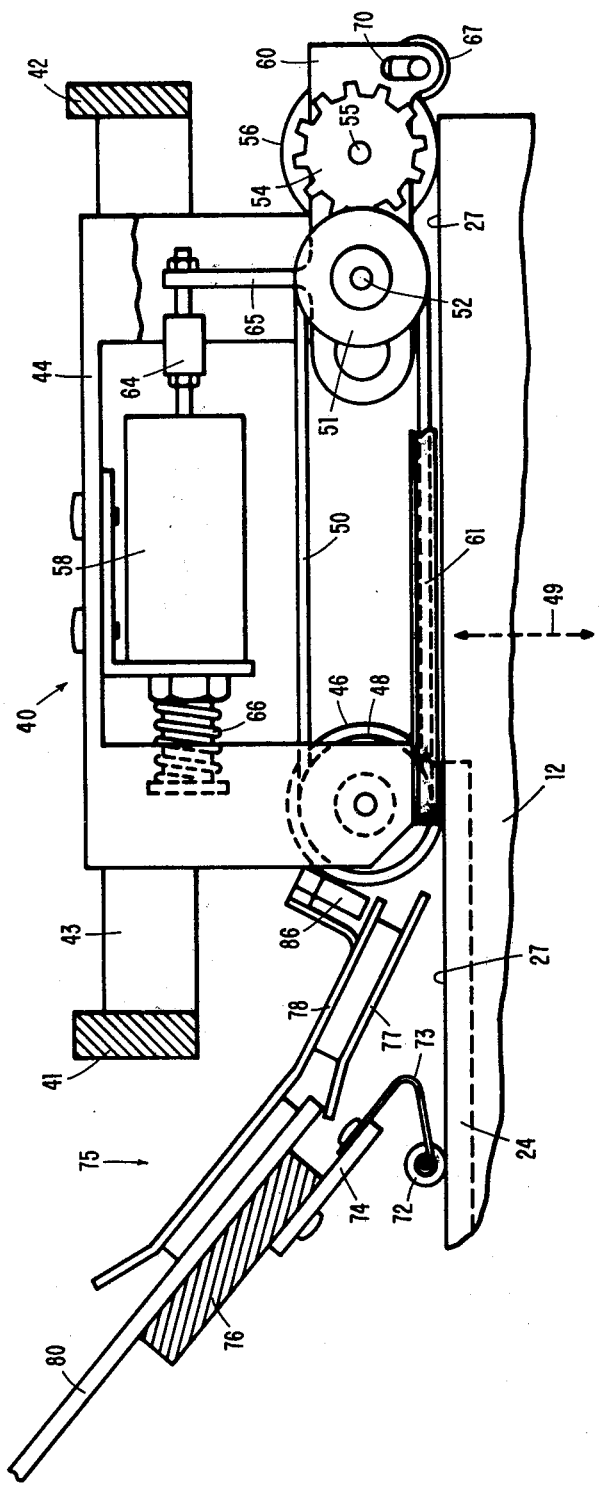
FIG. 4 is a partially sectioned, side view of an embodiment of a document ejector mechanism in accordance with this invention.
Figure 5:
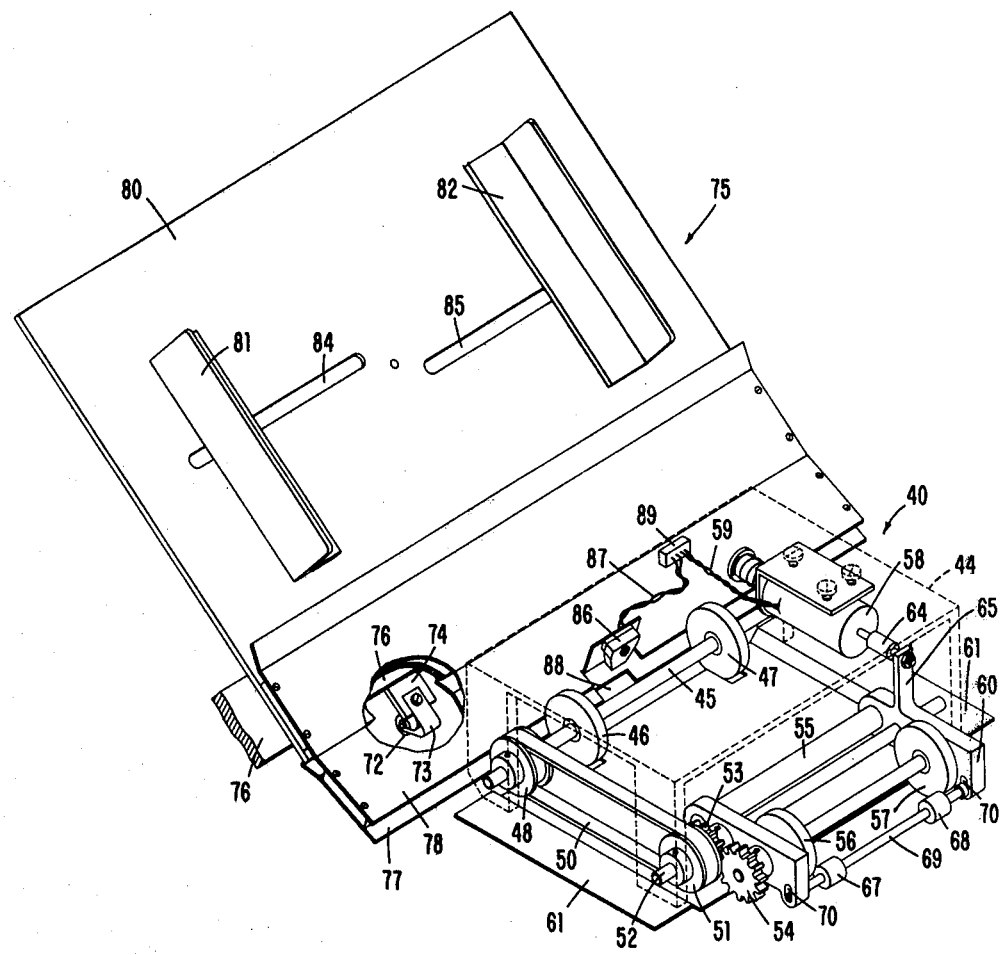
FIG. 5 is a perspective view of an embodiment of a document feeder and ejector in accordance with the present invention.

An assembly 40 for positively ejecting documents from the upper surface of reciprocating carriage 12 is shown in FIGS. 4 and 5. Assembly 40 is attached to a housing (not shown) but similar to housing 20 of FIG. 1 as by means of cross members 41, 42 and 43. Mounting frame 44 retains the ejector elements in their proper operating position relative to carriage 12 via downwardly extending legs. Shaft 45 is journaled between these downward extending legs for free rotation and has rollers 46 and 47 mounted thereon for engaging the upper surface of carriage 12 with the nip thus formed being generally in alignment with the leading edge reference line for platen 24.

The nip between rollers 46/47 and carriage 12 is also slightly upstream from the scanning window location 49. Pulley 48 is coupled by means of belt 50 to a follower pulley 51 mounted on shaft 52 which is also journaled for free rotation between the downward extending legs of frame 44. Belt 50 causes pulley 51 to rotate which, in turn, drives gear 53 and thus gear 54. Frictionally engaging rollers can be used in place of gears 53 and 54. Gear 54 is connected to shaft 55 so as to drive rollers 56 and 57. Accordingly, rollers 56 and 57 receive their rotary drive motivation from rollers 46 and 47 but rotate in an opposite direction with respect to rollers 46 and 47.

The engagement and disengagement of rollers 56 and 57 with the upper surface of reciprocating carriage 12 is controlled by solenoid 58 and yoke 60. Yoke 60 is connected to plunger 64 of solenoid 58 by means of lever arm 65. With solenoid 58 in its unactuated state, spring 66 forces plunger 64 in a direction so as to rotate yoke 60 around shaft 52, yoke 60 being mounted on but freely rotatable around shaft 52. Thus rollers 56 and 57 are normally pivoted upwardly so as not to engage the surface of carriage 12 thereby allowing documents being scanned to continue to be retained on carriage 12 as it reciprocates for however many copies have been selected. Retention of the documents on the surface of carriage 12 is augmented by idler rollers 67 and 68 mounted on shaft 69. By mounting shaft 69 in vertically elongated slots 70 and 71, rollers 67 and 68 are allowed to continue engaging the upper surface of carriage 12 even when rollers 56 and 57 have been pivoted upwardly by the action of spring 66 as mentioned previously. Rollers 67 and 68 thereby provide a document retention function for the sheets on the upper surface of carriage 12 regardless of the position of yoke 60.

A reflective plate 61 is attached to the lower legs of ejector housing 44 in a position to overlie scanning window location 49. This provides reflection of the illumination light to discharge the photo-conductor when no document happens to be over window 49 during a scanning operation. Plate 61 prevents imaging of the underside of ejector housing 44 and acts as a guide to restrain documents tending to curl upwardly under housing 44.

A document hold-down function is provided by one or more rollers 72 attached in freely rotating relation by a reverse-bend spring member 73. Spring 73 is attached to extender 74 from crossbar 76. By this arrangement, the left edge of a document on platen 24 is held down as carriage 12 returns towards the left during multiple copy operation. The reverse bend to spring 73 accommodates the situation wherein the left edge of carriage 12 passes to the right of roller 72 at the end of a scanning movement.

Input guide assembly 75 is attached to the overall housing by crossbar 76 and includes a pair of plates 77 and 78 to form an input chute to direct any documents introduced to the copier into the nip formed between rollers 46 and 47 and the upper surface of carriage 12. Plate 80 includes a pair of upstanding guide members 81 and 82 which are laterally movable in slots 84 and 85 so that a document introduced to the ramp formed by plates 77, 78 and 80 is appropriately centered as it enters the nip between carriage 12 and rollers 46 and 47. Upstanding guide members 81 and 82 can be appropriately interconnected in a conventional manner so that lateral movement of one member 81 or 82 automatically adjusts the other member by the same amount.

In operation, the document to be copied is fed face down over plates 80 and 77 and under plate 78 until its leading edge is engaged by the nip of rollers 46 and 47 and the upper surface of carriage 12. Carriage 12 then commences its reciprocal motion to the right in FIG. 4 either in response to manual or automatic machine controls. Movement of carriage 12 to the right causes the document to be pinched between surface 27 and rollers 46-47 so that the document is carried to the right over the scan window (not shown) for imaging, as is well known.

Solenoid 58 is coupled to operating power by appropriate electrical connections 59 but remains unactuated during most of the copier carriage operation. Thus spring 66 causes plunger 64 to withdraw and rollers 56-57 to disengage from the surface of carriage 12 while idler rollers 67 and 68 continue to engage surface 27. If more than one copy is to be made, solenoid 58 remains unactuated as carriage 12 returns to its home position carrying the document with it. Whenever the document has been copied by a preselected number of times and carriage 12 has moved to its completed scanning position, solenoid 58 is enabled so that plunger 64 extends to the right in FIGS. 4 and 5 thereby engaging the document by rollers 56 and 57. At that point, the document trailing edge has passed beyond the nip of rollers 46-47 and surface 27. As carriage 12 returns towards the left, the action of the belt coupling and gear couplings from rollers 46-47 to rollers 56-57 causes rollers 56 and 57 to drive the paper positively to the right to completely deposit it in the output tray (not shown in FIGS. 4 and 5) at least by the time carriage 12 reaches its home position.

An additional feature includable with the present invention, if desired, is illustrated in FIG. 5 in the form of a photocell and light source combination 86 which is positioned to detect the presence of the leading edge of a document at the end of ramp assembly 75. Light from the light source contained in assembly 86 is directed at an angle downwardly toward slot 88 in the bottom plate 77. As long as a document is absent, no light is reflected back to the photocell contained in assembly 86. The presence of the document causes light to be so reflected however, thereby generating a signal over wires 87 to the copier to immediately start running copies. A mechanical switch can provide the same function as photocell assembly 86.

The copier controls are connected by means not shown to terminal block 89 to receive the signals on wires 87 as an input and to provide appropriate solenoid 58 operating signals over wires 59. Although not illustrated, another prospective additional feature is to include a mechanical gate that is movably positioned in the pathway of input guide assembly 75 preferably at a point above the detector 86. This gate is normally withdrawn from intercepting relation with respect to documents fed into assembly 75 but, after complete withdrawal of a document from guide 75 such a gate can be raised (or lowered) so that it blocks passage of any document introduced to guide 75 while the copier 10 is performing copying operations on the previously fed document. This gate remains in the document intercepting position and is automatically withdrawn upon completion of the copying operation for the previous document and the returning of carriage 12 to its home position. Thus an operator can feed a next document to be copied into the input guide 75 during the copying of the preceding document and this second document is immediately accepted by the document feeder structure upon release of the gate and sensing of the document leading edge by the detector 86.

Although not all of the electrical connections for components such as detector 86, solenoid 58 and the like are specifically shown and the controlling electrical equipment associated therewith is likewise omitted, these devices are well known and are directly usable in conventional copiers with little or no modification. For instance, many contemporary copiers include microprocessors or controllers for controlling the operation of the copier and are easily adapted to perform the appropriately timed input and output signal generating operations in association with the detectors, solenoids and the like. However, a self-contained document feeder/ejector is possible by including a separate counter mechanism and appropriate feeder and/or ejector controls with the SADF thereby avoiding the copier interface. The user sets the SADF counter to the same count as the copier at the start of the copy run.

Figure 6:
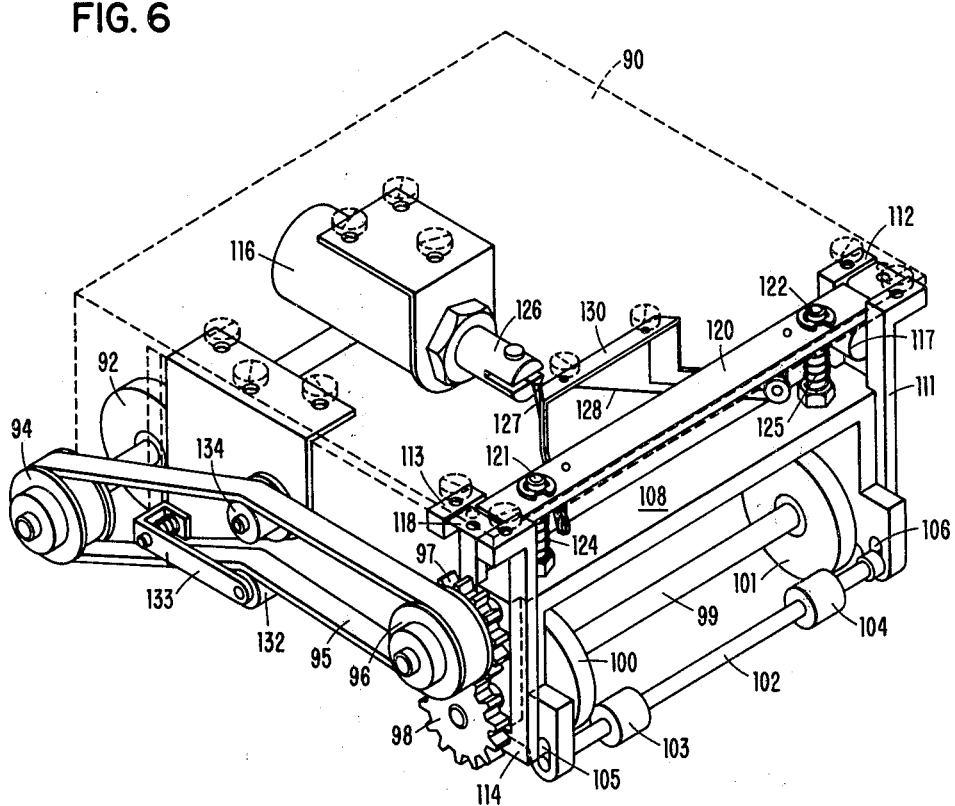
FIG. 6 is a perspective view of another embodiment of a document ejector mechanism.
Figure 7:
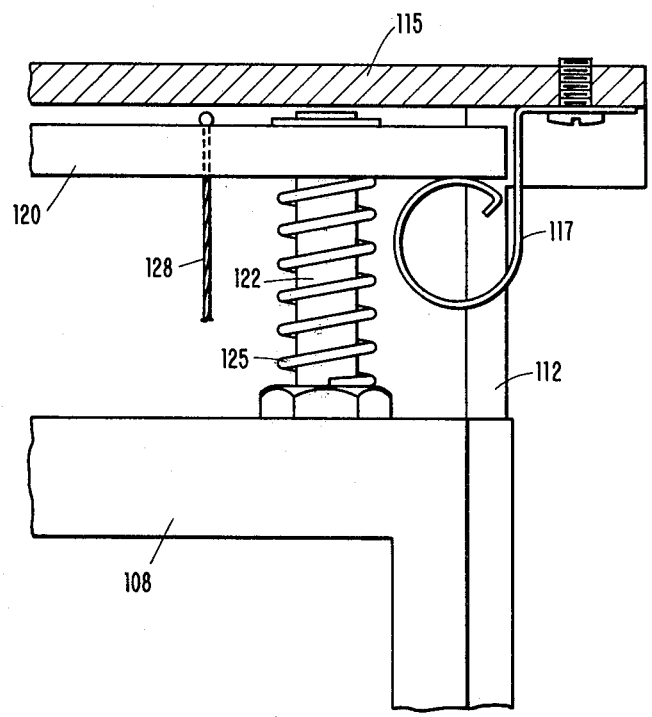
FIG. 7 is a partially sectioned view of a portion of the FIG. 6 mechanism.

FIGS. 6 and 7 illustrate yet another embodiment of a positive document ejecting mechanism in accordance with the present invention. In this configuration, housing 90 retains shaft 91 so that rollers 92 and 93 (only roller 92 being visible in the drawings) perform the document pinching operation relative to the surface of the reciprocating carriage in a manner similar to rollers 46 and 47 in FIGS. 4 and 5. Pulley 94 is attached to shaft 91 so as to turn in conjunction with rollers 92-93 and drive belt 95 which in turn drives pulley 96 and gear 97. Gear 97 drives gear 98 thus causing shaft 99 to rotate and, accordingly, rollers 100 and 101. This provides the positive document ejection operation similar to the operation of rollers 56 and 57 in FIGS. 4 and 5.

Shaft 102 is arranged to allow idler rollers 103 and 104 to rotate freely in either direction and also to traverse in a vertical direction through slots 105 and 106. The entire assembly including pulley 96, gears 97 and 98 and shafts 99 and 102 are all mounted in yoke 108. Yoke 108 is retained in its horizontal position by side frames 111, 112, 113 and 114 which are all secured to the upper plate 115 of housing 90 (note FIG. 7).

Under normal conditions wherein solenoid 116 is not actuated, side springs 117 and 118 push upwardly on bar 120 thus raising yoke 108 through shafts 121 and 122. A relatively light downward bias between yoke 108 and plate 120 is provided to springs 124 and 125 on shafts 121 and 122 respectively.

Solenoid 116 has its plunger 126 attached to a pair of cables 127 and 128 which are held in position by the yoke assembly 130 and which are further attached to plate 120. Actuation of solenoid 116 causes cables 127 and 128 to be drawn towards the body of solenoid 116. This imparts a downward force to plate 120 which compresses springs 117 and 118 so as to press yoke 108 and its rollers 100 and 101 downward against the surface of the reciprocating carriage. Since the rollers 100 and 101 are rotating in a direction opposite to rollers 92 and 93, the document which might happen to be under rollers 100 and 101 is thus driven to the right in FIG. 6 as the carriage moves to the left.

The entire assembly associated with yoke 108 is movable in a vertical direction depending upon the actuation state of solenoid 116. Further, when solenoid 116 is actuated so as to apply downward pressure through bar 120 onto yoke 108, this downward pressure is resilient in that it is transferred through compression springs 124 and 125 thereby accommodating variances in the thickness of the documents being ejected and the like. Note that the vertical movement of the ejector rollers is accommodated relative to belt 95 by idler roller 132 as shown in FIG. 6. Idler 132 is held by arm 133 which is spring-biased in an upward direction as seen in FIG. 6. Roller 134 is relatively fixed. Accordingly, as the yoke 108 assembly is moved up and down, the change in relative position between shafts 91 and the center of rotation of pulley 96 is accommodated by the movement of roller 132.

Figure 8A:
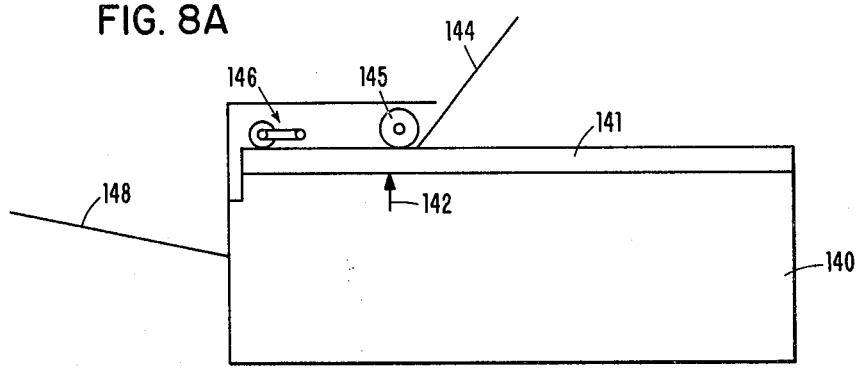
FIGS. 8A-8C illustrate side views showing respectively the start/end position, the start of scan position and the end of scan position of the carriage for a copier which uses a three-step reciprocal motion for document scanning.
Figure 8B:
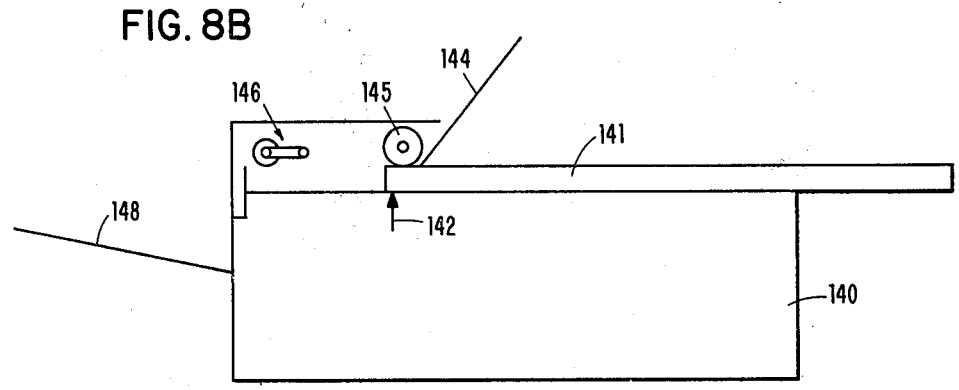

FIG. 8 shows a copier 140 with a carriage 141 that follows a somewhat different reciprocating motion in passing its documents over scan window 142. The normal home position is shown in FIG. 8A. Upon initiation of a copy cycle, carriage 141 moves to the right to the position of FIG. 8B. Note that a document introduced to input ramp 144 into the nip between roller 145 and the upper surface of carriage 141 is not withdrawn from ramp 144 while carriage 141 moves to the right since the rotary motion of roller 145 during this time is in a direction to keep the document on ramp 144 rather than to pinch it against carriage 141.

Figure 8C:
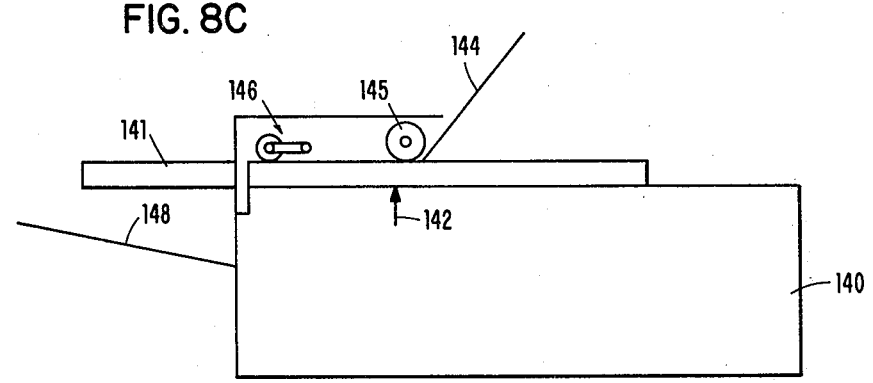

Carriage 141 at its FIG. 8B position is ready to commence the scanning portion of its reciprocating motion which is done by moving carriage 141 to the left until it reaches the FIG. 8C position. Finally, carriage 141 returns to its home position (FIG. 8A) with ejector assembly 146 being operative during this return motion to move the document off carriage 141 towards exit tray 148. If positive document ejection is desired, drive mechanisms similar to those shown in FIGS. 4-7 can be used for ejector 146. However, note that the amount of travel in returning from the FIG. 8C end-of-scan position to the FIG. 8A home position may be less than half the length of the document on carriage 141. In this case, appropriate gear ratios can be used to ensure that the output rollers 146 turn a greater number of times than input roller 145. Among the alternatives to a controlled gear ratio are the FIGS. 9 and 10 ejector configuration.

Figure 9:
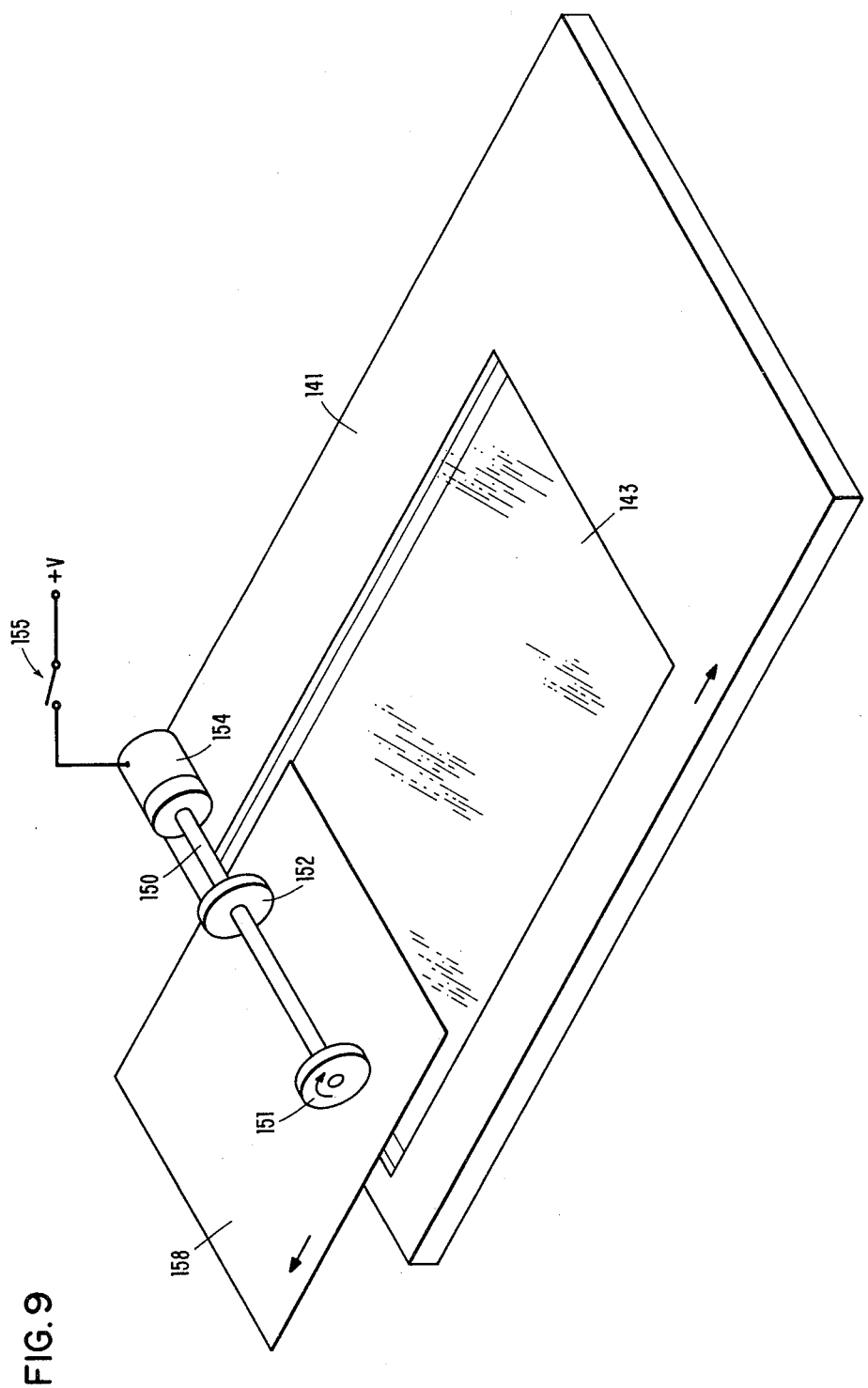
FIG. 9 is a partially schematic arrangement of a document ejector embodiment useful in the FIG. 8 environment.

FIG. 9 shows carriage 141 as it is moving to the right towards its home position. Ejector rollers 151 and 152 are attached to motor 154 by shaft 150. With switch 155 open, motor 154 is inoperative but rollers 151 and 152 are still free to rotate, thereby retaining document 158 in position on transparent platen 143 for multiple copying operations. When the last copy scan is complete and carriage 141 is in the FIG. 8C position, switch 155 is closed by the copier controls to energize motor 154. Motor 154 turns rollers 151 and 152 in the direction to drive sheet 158 to the left with sufficient force and speed to eject sheet 158 into the exit tray. Switch 155 is then reopened. Note that a mechanism to raise and lower rollers 151 and 152 can be included in the FIG. 9 configuration.

FIG. 10 illustrates another embodiment for fully ejecting a document from platen 143 during the short return stroke of carriage 141. Roller 160 (a feeder roller similar to 145 of FIG. 8 or a separate roller) follows the motion of carriage 141 with pawl 161 on roller 160 engaging ratchet 162. Ratchet 162 and shaft 164 attached thereto are free to rotate relative to roller 160 absent engagement by pawl 161. Spring 165 has one end attached to shaft 164 and the other attached to the machine frame. Spring 165 is wound so as to store energy while carriage 141 moves from its FIG. 8A to FIG. 8B positions. A second ratchet 166 is engaged by pawl 168 to prevent spring 165 from unwinding while carriage 141 moves in its scanning direction during which time roller 160 freely rotates around ratchet 162. Therefore spring 165 stores energy corresponding to the motion of carriage 141 from FIG. 8A to FIG. 8B with this stored energy being available when carriage 141 reaches its FIG. 8C position.

At the end of carriage 141 scan motion for the last copy of document 170, pawl 168 is released from ratchet 166 by solenoid 172 while pawl 161 is released from ratchet 162 by another solenoid, interposer, or the like (not shown). Spring 165 unwinds driving pulley 174, belt 175 and pulley 176. This drives shaft 178 and therefore wheels 180 and 181 in the proper direction for ejecting document 170 towards the left. Further, the length of time spring 165 so drivers rollers 180 and 181 is proportional to the time carriage 141 moved from its FIG. 8A to its FIG. 8B position. As long as the prescan motion of carriage 141 is equal to or less than the postscan motion, rollers 180 and 181 completely eject document 170 from carriage 141.

The FIG. 10 structure is also adaptable for raising and lowering kicker wheels 180 and 181 for multiple copy operation as discussed previously. In this mode, spring 165 is unwound at the end of every scan motion but only provides an ejection function when wheels 180 and 181 are lowered. Note that release of solenoid 172 at the end of the first scan stroke is effective to prevent overwinding of spring 165 during later carriage 141 motion for a multiple copy run. In this case, the ejection operation occurs when pawl 161 is released at the end of the last scan motion.

Although the present invention has been described with particularity relative to the foregoing detailed description of the exemplary preferred embodiments, various modifications, changes, additions and applications of the present invention in addition to those mentioned herein will be readily apparent to those having normal skill in the art without departing from the spirit of this invention.

What is claimed is:

1. In a machine such as a copier having a carriage which moves in a reciprocal manner so that a surface thereof passes over a station where an operation is performed relative to a document or the like, a document feeder comprising:
   means forming a nip with said carriage surface and for applying a force at said nip in a normal direction towards said carriage surface, and
   guide means positioned for directing the leading edge of a document into said nip between said nip forming means and said carriage surface so that movement of said carriage causes a document at said nip to be held against said carriage surface by said normal force and to be carried by said carriage across said station.

2. A document feeder in accordance with claim 1 which includes:
   means operable after the document passes over said station for removing the document from said carriage surface.

3. A document feeder in accordance with claim 2 which includes:
   means operable for selectively enabling and disabling said removing means from removing the document from said carriage surface.

4. A document feeder in accordance with claim 3 which includes:
   means responsive to said selectively operable enabling means for engaging the document on said carriage surface and driving said document in a direction away from said carriage surface.

5. A document feeder in accordance with claim 1 which includes:
   frame means having said nip forming means and said guide means attached thereto as an integral assembly, said frame means including means mounting said assembly for selective positioning between an operative location wherein said nip forming means forms said nip with said carriage surface and an inoperative position wherein said assembly is displaced relative to said carriage surface.

6. A document feeder in accordance with claim 1 which includes:
   means sensing the presence of a document at said guide means for producing a signal enabling initiation of movement of said carriage.

7. A document feeder in accordance with claim 6 which includes:
   gate means on said guide means movable between a first position for intercepting documents introduced to said guide means and a second position for allowing documents to move to said nip, and means controlling said gate means for coordinating said positions thereof in accordance with operation of said copier.

8. In a copier having a base and having a carriage movably mounted relative to said base with said carriage containing a transparent platen as part of at least a portion of the surface thereof with said platen having a reference for aiding in alignment of the leading edge of documents to be copied, and including means for reciprocally moving said carriage over a scan window so that an image is transferred into said copier from said platen as said carriage moves through a scan portion of its reciprocating motion, an improvement for said copier of a document feeder comprising:

roller means attached to said copier base and engaging said carriage surface for forming a nip therewith at an upstream location relative to said scan window, said nip being located at least in proximity to said platen reference when said copier is ready to initiate a copy scan motion, and ramp means attached to said copier base and positioned for directing the leading edge of a document into the upstream side of said nip between said roller means and said carriage surface whereby movement of said carriage causes a document on said ramp means with its leading edge at said nip to be gripped between said roller means and said platen so that the document is carried by said carriage across said scan window.

9. A document feeder in accordance with claim 8 which includes:

means attached to said copier base and engaging said carriage surface downstream of said scan window for removing the document from said platen as said carriage moves in a direction opposite from the scanning direction.

10. A document feeder in accordance with claim 9 which includes:

frame means for attaching said roller means, said ramp means and said document removing means to said copier base as an assembly, said frame means including means for selectively positioning said assembly between an operative location wherein said roller means engage said carriage surface and an inoperative position wherein said assembly is displaced relative to said carriage surface.

11. A document feeder in accordance with claim 9 which includes:

means driving said document removing means for propelling the document in a direction opposite said carriage as said carriage moves in a direction opposite from the scanning direction.

12. A document feeder in accordance with claim 11 which includes:

means mounting said document removing means for movement between first and second positions wherein said document removing means is respectively in engagement with said carriage surface and displaced from said carriage surface, said mounting means normally retaining said document removing means in said second position, and means responsive to said copier for shifting said mounting means from said second position to said first position at the end of the copy run for a given document.

13. A document feeder in accordance with claim 8 which includes:

a gate mounted in said ramp means for movement into and out of intercepting relation for documents introduced to said ramp means, and means responsive to said copier for coordinating operation of said gate means with operation of said copier, whereby a succeeding document is retained by said gate means in a ready position and fed to said nip after completion of copying of a previously fed document.

14. A document feeder in accordance with claim 8 or claim 13 which includes:

means producing an output indicative of the presence of a document at said nip, and means connecting said document indicative output to said copier for initiating copy operations.

15. In a copier having a base with a scan window on the upper surface with a transparent platen incorporated therein and with said platen having a reference line for aiding in alignment of the leading edge of documents to be copied, means mounting said carriage to said base for reciprocating motion over said base upper surface including a scanning portion during which said platen passes over said scan window so that an image of anything on the platen is transferred into said copier for processing and a reversing portion during which said carriage is returned to its home position, an improvement for said copier of a document feeder comprising:

an input ramp, roller means, and a frame having said roller means and said ramp means attached thereto as an assembly, said frame being pivotally attached to said copier base for movement between an operative position wherein said roller means and said ramp means cooperatively interrelate with said carriage and an inoperative position wherein said platen is accessible without interference from said assembly, said frame being constructed and arranged so that, when in said operative position, (a) said roller means forms a nip with said carriage upper surface at said platen reference line, and (b) said input ramp is oriented as a downwardly sloping guide for directing documents introduced to said input ramp into said nip on the side thereof opposite said scan window.

16. The method of feeding documents onto a carriage of a copier wherein the carriage moves in a reciprocal manner including at least a scan movement wherein documents are passed over a scan window and a reverse movement in a direction opposite to the scan movement, said method comprising the steps of:

introducing the leading edge of a document to be copied to the surface of said carriage at a point upstream from said scan window, pressing the leading edge of the document against said carriage surface at the point of introduction, and maintaining pressure against the document in a direction normal to said carriage surface while allowing the document to move with said carriage surface during the scan movement of said carriage reciprocal motion.

17. The method in accordance with claim 16 which further includes the step of removing the document from said carriage surface upon completion of said scan movement.

18. The method in accordance with claim 17 wherein said removing step includes the step of applying a force to the document after said scan movement completion to propel the document in the same direction as the scan movement.

19. In a copier having a base with a scan window and a carriage adapted for receiving documents to be copied on a surface thereof with the carriage mounted for reciprocal motion over said copier base, including a scan movement during which the document is passed over said scan window, and a reverse movement during which said carriage is returned to a home position, an improvement comprising:

means operable at the end of said scan movement for engaging the document on said carriage surface and removing the document from said carriage surface.

20. Apparatus in accordance with claim 19 which includes:

means selectively operable between two operating modes for respectively enabling and disabling the document removing operation of said engaging and removing means.

21. Apparatus in accordance with claim 20 wherein said engaging and removing means includes:

means responsive to said enabling mode operation of said selectively operable means for propelling the document in a direction away from said carriage surface.

22. Apparatus in accordance with claim 19 wherein said engaging and removing means includes:

means operable after completion of said scan movement for applying a force to the document in the same direction as the scan movement.

* * * * *